Jan. 23, 1968
H. EILENBERG ET AL
3,364,591
FREEZE DRYING APPARATUS
Filed June 14, 1966
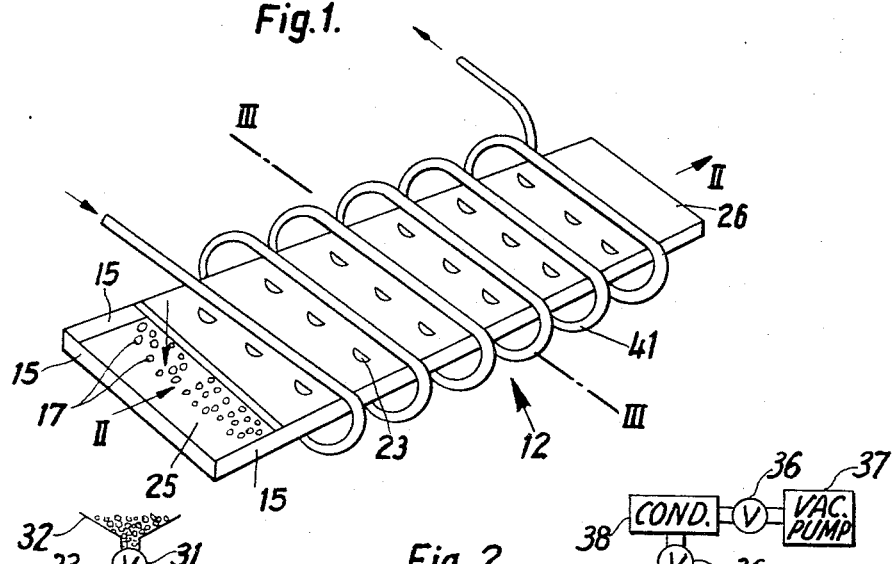
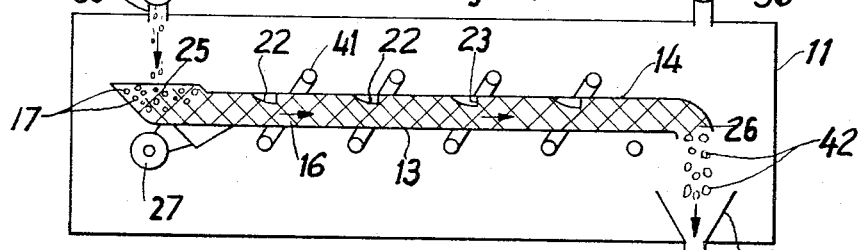
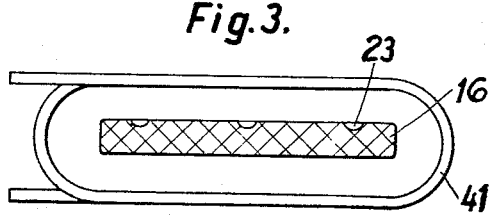
Inventors:
Hanns Eilenberg
Franz-Josef Schmitz
BY John E. Toupal
ATTORNEY.

3,364,591
FREEZE DRYING APPARATUS
Hanns Eilenberg, Rosrath, and Franz-Josef Schmitz, Weiden, Germany, assignors to Leybold-Anlagen Holding A.G., Zug, Switzerland, a corporation of Switzerland
Filed June 14, 1966, Ser. No. 557,477
Claims priority, application Germany, June 16, 1965, L 50,921
9 Claims. (Cl. 34—92)

ABSTRACT OF THE DISCLOSURE

An elongated rectangular housing for transporting a particulate product through a vacuum drying chamber, includes bottom, side and top walls. The housing is disposed generally horizontally within the vacuum chamber, but inclined slightly from end to end. At its higher end, an intake opening is provided in the top wall through which the product particles are received into the housing. This intake opening is aligned vertically with an intake opening and feedlock in the vacuum chamber, through which the product particles are fed to the housing by gravity. A discharge opening is provided in the bottom wall of the housing at the lower end thereof; and this opening is aligned with a vacuum chamber discharge opening and discharge lock. The elongated housing is generally enclosed by a hollow heating coil through which a heating fluid is passed. A vibrator of any known type is connected to the intake end of the housing to vibrate the entire housing, whereby the particles are agitated and moved along the housing to the discharge end. The particles are vibrated into engagement with the top and bottom walls of the housing, which are heated by the heating coil, whereby the particles are dried. The top wall of the housing is provided with vent openings for the escape of water vapor sublimated from the frozen particles; and these openings are arranged to inhibit the loss of the frozen particles through the openings as the result of the vibration. Also, the vent openings are arranged, relative to the heating coils, to shield the particles from direct radiant heat.

---

This invention relates generally to freeze drying apparatus and especially to freeze drying apparatus for drying particulate substances.

Freeze drying is a well known process in which a substance to be dried is first frozen and then placed within an evacuable chamber. Water vapor removal apparatus, such as, refrigerated condensers then absorb sublimating water vapor produced by heating of the frozen substance. A predetermined low pressure is continuously maintained within the vacuum chamber during the drying process by means of conventional vacuum pumps communicating with the chamber.

One of the more perplexing problems in the freeze drying industry has been the high cost of equipment relative to its product throughput capacity. The primary objectives in attempting to alleviate this problem are increasing the utilized volume within the relatively expensive vacuum chambers required, improving the transfer of sublimation inducing heat to the frozen material without damage thereof, and providing more effective removal of the sublimating water vapor produced during the freeze drying process. Unfortunately, the desired objectives are contradictory since the maximum utilization of vacuum chamber volume entails a large substance density therein which in turn hinders the efficiency of heat transfer and water vapor removal. When heat is applied to a frozen mass of substance within a vacuum chamber at relatively low pressure, the surface of the substance mass dries rapidly leaving an increasingly thick layer of insulating dry material surrounding the decreasing ice core. This insulating material interferes with efficient heating of the remaining ice core; and if the substance being dried exists in thick layers, the problem of heat transfer is magnified. Furthermore, since the amount of heat which can be applied is limited by the heat sensitivity of the drying substance, which in the case of food stuffs is relatively low, the problem is again magnified. In addition, the dried surface layer provides an effective barrier to the efficient removal of water vapor liberated from the ice core. This can result in localized areas of high vapor pressure and resultant partial thawing of the substance which substantially reduces the quality of the finished product.

A known arrangement for improving heat transfer and vapor removal in a freeze drying process utilizes a vibrating shelf or belt to convey within the vacuum chamber frozen particles being dried. The vibrating surface produces continuous agitation of the particles and intermittent contact with the conveyor surface. While this system achieves a substantial reduction in required drying time by greatly improving heat transfer and ease of water vapor removal, the problem of efficient vacuum chamber space utilization remained since the apparatus inherently limits the depth of the particulate substance layers which can be effectively transported.

The object of this invention, therefore, is to provide freeze drying apparatus which will substantially reduce processing costs by providing maximum utilization of vacuum chamber volume and efficient heat transfer and vapor removal during the drying process.

One feature of this invention is the provision of a freeze drying apparatus having a housing with bottom, top and side wall portions which substantially isolate the interior volume of the housing from the interior of an enclosing evacuable chamber. The apparatus further includes a vibrator device for producing, within the housing, vibratory motion of contained frozen material particles which are retained by the isolating top and side wall portions of the housing. By preventing escape of the agitated particles, the top and side wall housing portions permit the vibration and efficient drying of relatively thick layers of frozen particles in addition to providing desirable additional surface area for heat transferring contact therewith.

Another feature of this invention is the provision of a freeze drying apparatus of the above featured type wherein the housing possesses an inlet opening adapted to receive frozen particles from an inlet opening in the vacuum chamber and an outlet opening adapted to discharge dried particles through an outlet opening in the vacuum chamber, and wherein the housing is adapted to produce linear movement of the vibrating material particles in a direction from the housing inlet to the housing outlet thereby permitting a continuous drying operation.

Another feature of this invention is the provision of a freeze drying apparatus of the above featured types wherein the vibrator device comprises a mechanical vibrator connected to the bottom wall of the housing and adapted upon energization to produce vibration thereof.

Another feature of this invention is the provision of a freeze drying apparatus of the above featured types wherein the top and side wall portions of the housing are integral with the bottom wall portions so as to be vibrated therewith.

Another feature of this invention is the provision of a freeze drying apparatus of the above featured types wherein the top wall portion of the housing contains apertures which permit escape of water vapor but prevent escape of the vibrating material particles.

Another feature of this invention is the provision of a freeze drying apparatus of the above featured type wherein the apertures in the housing top wall portion are formed so as to provide no obstruction free paths between the interior and exterior of the housing in a direction perpendicular to the housing bottom wall portion.

Another feature of this invention is the provision of a freeze drying apparatus of the above featured type wherein the housing top wall portion includes indentures having apertures formed in planes substantially perpendicular to the housing bottom wall portion.

Another feature of this invention is the provision of a freeze drying apparatus of the above featured types wherein the housing wall portions are arranged so as to completely shield the vibrating material particles from direct radiant heat emanating from radiant heater surfaces positioned between the outer surface of the housing and inner surface of the enclosing vacuum chamber.

These and other features and objects of the present invention will become apparent upon a perusal of the following specification taken in conjunction with the accompanying drawings wherein:

FIG. 1 is a schematic plan view illustrating a preferred vibrating housing embodiment of the invention;

FIG. 2 is a schematic cross-section taken along lines II—II of FIG. 1 and also illustrating the enclosing vacuum chamber; and FIG. 3 is a schematic cross-section taken along lines III—III of FIG. 1.

Referring now to the figures there is shown within the vacuum chamber 11 the housing 12 having the bottom wall 13, the top wall 14 and the side walls 15. The housing 12 defines a volume 16 in which the frozen particles 17 are to be dried. Pressed into the top wall 14 are a plurality of indentures 22 in each of which is formed an aperture 23. As shown, the apertures 23 lie in planes which are perpendicular to the bottom wall 13. Also formed in the top wall 14, at one end of the housing 12, is the housing inlet opening 25; while the housing outlet opening 26 is formed in the bottom wall 13 at the opposite end of the housing 12. The mechanical vibrator 27, of a conventional type, is attached to the bottom wall 13 adjacent the housing inlet 25. Mechanical vibration of the entire housing 12 is produced by actuation of the vibrator 27, which is also adapted to permit vertical positioning of the inlet end of the housing 12.

The material feeder lock 31 provides communication between the supply hopper 32 and the vacuum chamber inlet 33, while connected to the vacuum chamber outlet 34 is the material discharge lock 35. The vacuum locks 31 and 35 can be of conventional type as, for example, shown in U.S. Patent No. 2,751,687 or U.S. Patent No. 3,088,222. Connected by valve 36 between the vacuum pump 37 and the vacuum chamber 11 is the refrigerated condenser 38. The hollow heating coil 41 is adapted for connection to a suitable source of heating fluid (not shown), so as to heat the encircled housing 12 which is preferably made of a good heating conducting material such as aluminum.

Typical operation of the embodiment shown in FIGS. 1–3 occurs in the following manner: the inlet end of the housing 12 is raised relative to the outlet end, with the vibrator mechanism 27, so as to provide a desired inclination for the bottom wall 13. The desired degree of inclination which causes linear movement of the frozen particles 17 from the housing inlet 25 to the housing outlet 26 will vary in dependence upon the material being processed. Opening of the valves 36 and actuation of the vacuum pump 37 will then effect evacuation of the chamber 11. Frozen substance particles obtained, for example, by grinding of frozen substance blocks, by spray freezing processes, etc. are supplied from the supply hopper 32 into the vacuum chamber 11 through the feeding lock 31. The introduced frozen particles 17 pass through the chamber inlet 33 into the housing through the adjacent housing inlet 25. Within the housing 12 the particles 17 are continuously agitated by the vibrating walls thereof so as to come into periodic contact with both the bottom wall 13 and the top wall 14, as they travel from the inlet 25 toward the outlet 26 under the influence of the vibratory motion and the inclination of the housing 12. Upon reaching the housing outlet 26, the completely dried particles 42 fall through the adjacent chamber outlet 34 and are removed through the discharge lock 35.

Because the housing side walls 15 and top wall 14 prevent escape from the housing 12 of the vibrating particles 17, relatively thick substance layers of, for example, 5–10 times the individual particle thickness can be transmitted through the housing 12. In addition, the side wall portions 15 and top wall 14 provide additional heated surfaces for contact with the vibrating particles 17 thereby substantially increasing the heat transfer capabilities of the apparatus.

The apertured indentures 22 in the top wall 14 provide the necessary conductance paths for the escape of water vapor sublimating from the frozen particles 17. Furthermore, they are uniquely suited for this particular application in that they do not provide obstruction free paths between the inside and outside of the housing 12 in a direction perpendicular to the bottom wall 13. Since this is the primary direction of movement of the vibrating particles 17, substantially no particles will escape through the apertures 23. Another important feature of the invention is the arrangement wherein, as shown in FIG. 2, the heating coils 41 are so positioned relative to the apertured indentures 22 as to provide no direct paths between the surfaces of the heating coils 41 and the interior of the housing 12. Thus, the coils 41 may be operated at relatively high temperatures without danger of burning the particles 17 with direct radiant heat.

While the embodiment illustrated in FIGS. 1–3 provides a single housing 12 within the vacuum chamber 11, it will be obvious that a plurality of such chambers can be mounted within a single vacuum chamber. Such an arrangement would be desirable for large scale freeze drying operations and in a practical embodiment a common vibrator drive could activate a plurality of individual particle housings. In such a plural housing embodiment wherein the individual housings are vertically stacked, it is desirable to provide between the individual housings gaps of, for example, 10–15 millimeters which provide a communication path for escape of water vapor leaving the housing apertures 23.

Obviously, many modifications and variations of the present invention are possible in light of the above teachings. It is, therefore, to be understood that within the scope of the appended claims the invention may be practiced otherwise than as specifically described. For example only, agitation of the substance particles can be achieved in other ways such as by application of electrostatic fields.

What is claimed is:

1. Freeze drying apparatus comprising:
   an evacuable chamber;
   an elongated material conveying housing positioned generally horizontally within said chamber; said housing having top, bottom and side walls which substantially completely isolate the interior thereof from the remainder of said evacuable chamber; said housing having an inlet opening at one end thereof, for receiving the frozen product to be dried, and an outlet opening at the other end thereof, for discharging the dried product;
   heating means for heating the walls of said housing;
   and vibrating means for vibrating said housing, and the product contained therein, to effect intermittent contact of the product particles with the walls thereof.

2. Freeze drying apparaus as set forth in claim 1: wherein said evacuable chamber includes inlet and outlet means for passing the particulate product into and out of the chamber;

and wherein said housing inlet and outlet openings communicate, respectively, with said chamber inlet and outlet means.

3. Freeze drying apparatus as set forth in claim 1, wherein said vibrating means acts on said housing to produce linear movement of the product particles in a direction from the housing inlet to the housing outlet.

4. Freeze drying apparatus as set forth in claim 1, wherein said housing top wall contains apertures adapted to permit escape of water vapor from said housing, and to prevent escape therefrom of vibrating product particles.

5. Freeze drying apparatus as set forth in claim 4, wherein said apertures are so formed as to provide no obstruction free paths between the interior and exterior of said housing in a direction perpendicular to said bottom wall.

6. Freeze drying apparatus as set forth in claim 5, wherein said housing defines confronting top and bottom walls; and wherein said vibrating means effect vibrating movement of the product particles in a direction generally perpendicular to the top and bottom walls, and into heat transfer engagement with both the top and bottom walls.

7. Freeze drying apparatus as set forth in claim 4, wherein said top wall apertures are formed in indentures in said wall, and lie in planes generally perpendicular to the bottom wall, thereby inhibiting the passage of vibrating particles through said openings.

8. Freeze drying apparatus as set forth in claim 1, wherein said heating means comprises radiant heater surfaces positioned adjacent the outer walls of said housing; and wherein the walls of said housing completely shield the particulate product from the direct radiant heat emanating from said heater surfaces.

9. Freeze drying apparatus as set forth in claim 1, wherein said heating means comprises a hollow coil surrounding said housing adapted to flow a heating fluid.

References Cited

UNITED STATES PATENTS

| | | | |
|---|---|---|---|
| 3,247,600 | 4/1966 | Togashi | 34—5 |
| 3,264,747 | 8/1966 | Fuentevilla | 34—5 |
| 3,286,365 | 11/1966 | Hackenberg | 34—92 |

WILLIAM J. WYE, *Primary Examiner.*